(12) United States Patent
Leaver et al.

(10) Patent No.: US 6,562,082 B1
(45) Date of Patent: May 13, 2003

(54) DISPERSE DYE MIXTURE

(75) Inventors: Alan Thomas Leaver, Manchester (GB); David Brierley, Royton (GB)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/673,648

(22) PCT Filed: Apr. 30, 1999

(86) PCT No.: PCT/GB99/01349

§ 371 (c)(1),
(2), (4) Date: Nov. 1, 2000

(87) PCT Pub. No.: WO99/57362

PCT Pub. Date: Nov. 11, 1999

(30) Foreign Application Priority Data

Jan. 5, 1998 (GB) ................................. 9809454

(51) Int. Cl.$^7$ ............................ D06P 3/54; C09B 67/38
(52) U.S. Cl. ...................... 8/532; 8/533; 8/638; 8/639; 8/922
(58) Field of Search ............................ 8/638, 639, 529, 8/532, 533, 922

(56) References Cited

U.S. PATENT DOCUMENTS 5,550,192 A * 8/1996 Sheth et al.

FOREIGN PATENT DOCUMENTS

| EP | 300626 | * | 1/1989 |
| EP | 324409 | * | 1/1989 |
| EP | 347685 | * | 12/1989 |
| GB | 1578733 | * | 11/1980 |
| GB | 2312436 | * | 10/1997 |
| WO | WO 97/04030 | * | 2/1997 |

* cited by examiner

Primary Examiner—Margaret Einsmann
(74) Attorney, Agent, or Firm—Oblon, Spivak, McClelland, Maier & Neustadt, P.C.

(57) ABSTRACT

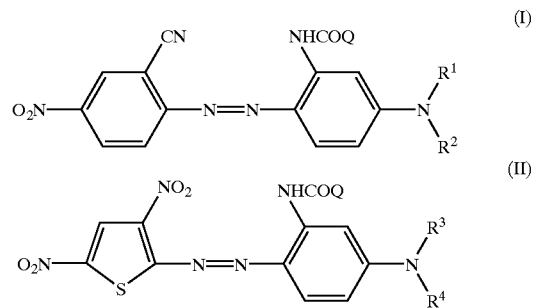

A dye mixture comprises (A) at least one dye of formula (I) wherein X is Cl, Br or I; Q is $C_{1-4}$alkyl; and each of $R^1$ and $R^2$ independently, is $C_{1-4}$alkyl or $C_{1-4}$alkenyl; and (B) at least one dye of formula (II) wherein $Q^1$ is $C_{1-4}$alkyl; and each of $R^1$ and $R^2$ independently, is $C_{1-4}$alkyl or $C_{1-4}$alkenyl.

12 Claims, No Drawings

DISPERSE DYE MIXTURE

This invention relates to mixtures of disperse dyes, compositions comprising a dispersion of such a mixture and processes for the colouration of synthetic materials with such mixtures. More particularly, the invention relates to a mixture comprising at least two monoazo dyes. The two monoazo dyes each have respective aromatic nuclei linked by an azo group, one of the aromatic nuclei in each dye having a dialkyl- or dialkenyl- group para to the azo group. In a first such dye of the mixture, the other aromatic nucleus is a benzene ring substituted by a nitro group (some of which dyes tend to be reddish blue in colour), while in a second such dye, the other aromatic nucleus is a thiophene nucleus substituted by a nitro group (some of which dyes tend to be green in colour).

EP-A-0300626 discloses mixtures of dyes containing only dyes of the abovementioned first type having a nitrobenzene group; while each of EP-A-0347685 and WO-A-97/04030 discloses mixtures of dyes of the first and second types containing nitrobenzene and nitrothiophene groups respectively.

However, it is found that certain mixtures, although giving bright reddish blue shades on polyester when viewed in normal daylight, tend to exhibit a "red" flare in tungsten light which is a serious commercial disadvantage.

Although the problem of "flare" is solved by at least one mixture disclosed in EP-A-0300626, this is achieved at the cost of brightness; such a mixture gives a relatively dull shade. Similarly, this problem of "flare" may be solved by at least one of the mixtures disclosed in EP-A-0347685, but such a mixture is especially sensitive to reduction and has relatively low heat fastness. Likewise flare can be avoided by using a dye mixture in which the nitrothiophene carries an acetyl group. However, such dyes tend to be expensive.

We have found surprisingly that a mixture of dyes, as defined below, surprisingly not only allows reduction or even elimination of the "red" flare, but provide a brighter shade, are less sensitive to reduction and have a higher heat fastness than other known mixtures and at less expense.

Thus, the invention provides a mixture of dyestuffs containing at least (A) at least one dye of the formula

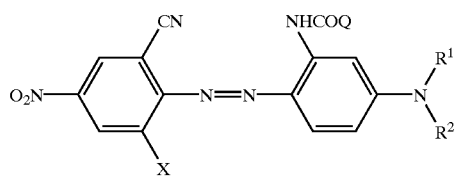

wherein

X is Cl, Br or I;

Q is $C_{1-4}$alkyl; and each of $R^1$ and $R^2$, independently, is $C_{1-4}$alkyl or $C_{1-4}$alkenyl; and (B) at least one dye of the formula (II)

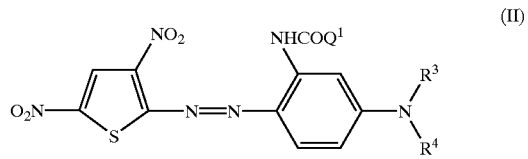

wherein $Q^1$ is $C_{1-4}$alkyl; and each of $R^3$ and $R^4$, independently, is $C_{1-4}$alkyl or $C_{2-4}$alkenyl.

An especially preferred value of X is Br, especially preferred values of Q and $Q^1$ are a methyl and ethyl and especially preferred values $R^1$, $R^2$, $R^3$ and $R^4$ are methyl, ethyl and allyl.

Especially preferred mixtures contain respectively, (a) a dye of the formula (I), wherein X is Br, Q is methyl and each of $R^1$ and $R^2$ is ethyl [dye (1)] and a dye of the formula (II), wherein $Q^1$ is methyl and each of $R^3$ and $R^4$ is ethyl [dye (2)] (which dye is known as CI Disperse Green 9), more preferably such a mixture in which the ratio of dye (I):dye (II) is 91.5:8.5, (b) a dye of the formula (I), wherein X is Br, Q is ethyl and each of $R^1$ and $R^2$ is ethyl [dye (3)] (which dye is known as CI Disperse Blue 183) and a dye of the formula (II) which is the abovementioned dye (2) (CI Disperse Green 9) and (c) a dye of the formula (I), wherein X is Br, Q is methyl and each of $R^1$ and $R^2$ is ethyl (dye (1) of mixture (a) above) and a dye of the formula (II), wherein X is Br, $Q^1$ is methyl and each of $R^3$ and $R^4$ is allyl [dye (4)].

A preferred ratio of dye (I):dye (II), by weight, is 98:2 to 50:50, more preferably 95:5 to 70:30, especially 93:7 to 85:15.

The individual dyes may be prepared in a conventional manner by diazotisation and coupling.

More particularly, (I), an amine of formula (III)

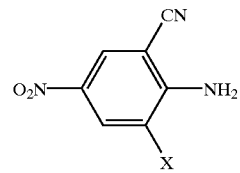

wherein X is Cl, Br or I, is diazotised and coupled with a coupling component of the formula (V)

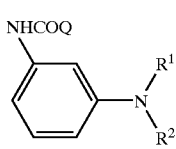

wherein Q, $R^1$ and $R^2$ are as defined above.

For dye (II), an amine of the formula (IV)

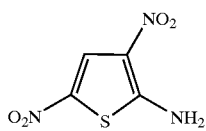

is diazotised and coupled with a coupling component of the formula (VI)

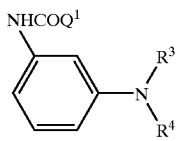

wherein $Q^1$, $R^3$ and $R^4$ are as defined above.

In the above diazotisation and coupling reactions, the diazotization is carried out using a diazotising agent, which is preferably nitrosyl sulphuric acid, optionally diluted with glacial acetic acid or a phosphoric/acetic acid mixture and preferably at a temperature of 0–10° C., more preferably 0–5° C. The coupling reaction is preferably carried out at a is temperature of 0–10° C., more preferably 0–5° C. and preferably at a pH<1 (say 0.5 ) up to 7, more preferably 0.5–1, followed by a subsequent increase in pH to 3–4 to isolate the dye.

The mixture of at least one dye of formula (I) and at least one dye of the formula (II) may additionally comprise at least one other dye, especially a yellow, orange, red or brown dye capable of producing a navy or black shade.

Mixtures embodying the invention can be prepared by a number of methods including (1) Co-crystallisation Typically, the dyes are dissolved in a hot solvent, for example, by placing the dyes in a suitable solvent and heating up to the reflux temperature of the solvent until the dyes are dissolved, thereafter filtering to provide a solution, and then allowing the solution to cool and crystals to form. The resultant mixture may then undergo further processing, such as milling and spray drying. Example of suitable solvents for this process are organic solvents such as aromatic hydrocarbons, chlorinated hydrocarbons, aliphatic hydrocarbons, alicyclic hydrocarbons, alcohols, amides, sulphoxides, esters, ketones and ethers. Specific examples of organic solvents are toluene, ethyl cellosolve, acetone, chlorobenzene, pyridine, dimethyl formamide, diemthylsulphoxide, ethyl acetate, benzene, tetrahydrofuran and cyclohexane.

(2) Co-milling (a) The dyes are mixed and then milled together to give an intimate blend which is then spray dried to give a solid mixture; or (b) each dye is milled separately and then mixed in the required ratio before spray drying.

(3) Dry Blending

Each dye is spray dried separately and then mixed in the required ratio by a dry blending process.

The mixtures give an especially bright shade without exhibiting a red flare in tungsten light.

Mixtures embodying the invention provide especially useful disperse dyes valuable for colouring synthetic textile materials and fibre blends thereof, and may be formed into a dispersion for this purpose.

According to other aspects, the invention provides a composition comprising at least the dye mixture and a dispersing agent, surfactant or wetting agent, suitable for providing such a dispersion and also a process for colouring a synthetic textile material or fibre blend thereof which comprises applying to the synthetic textile material or fibre blend a mixture comprising at least one dye of the formula (I) and at least one dye of the formula (II).

The synthetic textile material may be selected from aromatic polyester, especially polyethylene terephthalate, polyamide, especially polyhexamethylene adipamide, secondary cellulose acetate, cellulose triacetate, and natural textile materials, especially cellulosic materials and wool. An especially preferred textile material is an aromatic polyester or fibre blend thereof with fibres of any of the above mentioned textile materials. Especially preferred fibre blends include those of polyester-cellulose, such as polyester-cotton, and polyester-wool. The textile materials or blends thereof may be in the form of filaments, loose fibres, yarn or woven or knitted fabrics.

The mixtures of dyes of formulae [I] and [II] optionally in conjunction with other disperse dyes may be applied to the synthetic textile materials or fibre blends by processes which are conventionally employed in applying disperse dyes to such materials and fibre blends.

Suitable process conditions may be selected from the following (I) exhaust dyeing at a pH of from 4 to 6.5, at a temperature of from 125° C. to 140° C. for from 10 to 120 minutes and under a pressure of from 1 to 2 bar, a sequestrant optionally being added;

(ii) continuous dyeing at a pH of from 4 to 6.5 at a temperature of from 190° C. to 225° C. for from 15 seconds to 5 minutes, a migration inhibitor optionally being added;

(iii) printing direct at a pH of from 4 to 6.5, at a temperature of from 160° C. to 185° C. for from 4 to 15 minutes for high temperature steaming, or at a temperature of from 190° C. to 225° C. for from 15 seconds to 5 minutes for bake fixation with dry heat or at a temperature of from 120° C. to 140° C. and 1 to 2 bar for from 10 to 45 minutes for pressure steaming, wetting agents and thickeners (such as alginates) of from 5 to 100% by weight of the dye optionally being added;

(iv) discharge printing (by padding the dye on to the textile material, drying and overprinting) at a pH of from 4 to 6.5, migration inhibitors and thickeners optionally being added;

(v) carrier dyeing at a pH of from 4 to 6.5, at a temperature of from 95° C. to 100° C. using a carrier such as methylnaphthalene, diphenylamine or 2-phenylphenol, sequestrants optionally being added; and (vi) atmospheric dyeing of acetate, triacetate and nylon at a pH of from 4 to 6.5, at a temperature of 85° C. for acetate or at a temperature of 90° C. for triacetate and nylon for from 15 to 90 minutes, sequestrants optionally being added.

In all the above processes, the dye mixture is applied as a dispersion comprising from 0.001% to 6, preferably from 0.005 to 4%, of the dye mixture in an aqueous medium.

A particular aspect of the invention provides a composition comprising a mixture of dyes (I) and (II), optionally at least one other disperse dye and, additionally, optionally at least one further ingredient conventionally used in colouring applications such as a dispersing agent, surfactant or wetting agent. The composition typically comprises from 1% to 65%, preferably 10 to 60%, more preferably 20 to 55%, of the total dye mixture in a liquid, preferably an aqueous, or solid medium. Liquid compositions are preferably adjusted to pH 2 to 7, more preferably pH 4 to 6.

Typical examples of dispersing agent are lignosulphonates, naphthalene sulphonic acid/formaldehyde condensates and phenol/cresol/sulphanilic acid/ formaldehyde condensates, typical examples of wetting agent are alkyl aryl ethoxylates which may be sulphonated or phosphated and typical examples of other ingredients which may be present are inorganic salts, de-foamers such as mineral oil or nonanol, organic liquids and buffers. Dispersing agents may be present at from 10% to 200% on the weight of the dye mixtures. Wetting agents may be used at from 0% to 20% on the weight of the dye mixtures.

The compositions may be prepared by bead milling the dye mixture with glass beads or sand in an aqueous medium. The compositions may have further additions of dispersing agents, fillers and other surfactants and may be dried, by a technique such as spray drying, to give a solid composition comprising from 5% to 65% of dyestuff.

In addition to the above-mentioned application processes, the dye mixtures may be applied to synthetic textile materials and fibre blends by ink-jet printing, the substrates optionally having been pre-treated to aid printing. For ink-jet applications, the application medium may comprise water and a water-soluble organic solvent, preferably in a weight ratio of 1:99 to 99:1, more preferably 1:95 to 50:50 and especially in the range 10:90 to 40:60. The water-soluble organic solvent preferably comprises a $C_1$–$C_4$-alkanol, especially methanol or ethanol, a ketone, especially acetone methyl ethyl ketone, 2-pyrrolidone or N-methylpyrrolidone, a glycol, especially ethylene glycol, propylene glycol, trimethylene glycol, butane-2,3-diol, thiodiglycol or diethylene glycol, a glycol ether, especially ethylene glycol monomethyl ether, propylene glycol monomethyl ether or diethylene glycol monomethyl ether, urea, a sulphone, especially bis-(2-hydroxyethyl) sulphone or mixtures thereof.

The dye mixtures may also be applied to textile materials using supercritical carbon dioxide, in which case the dye formulating agents may optionally be omitted.

Embodiments of the present invention will now be described in more detail with reference to the following Examples, in which parts are by weight unless otherwise stated.

EXAMPLES 1–2

Preparation for Individual Dyes

Example 1

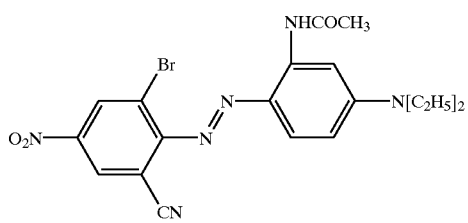

2-Bromo-4-nitro-6-cyanoaniline (24 parts) was stirred at 0–5° C. with a mixture of acetic/propionic acids (100 parts, 86:14). Nitrosyl sulphuric acid (35 parts, 40% solution in $H_2SO_4$) was added gradually at 0–5° C. and the mixture was stirred at that temperature for 60 mins. The diazo solution was added to a coupling mixture or N,N-diethyl-m-aminoacetanilide (21.6 parts), water (100 parts), conc. sulphuric acid (20 parts) and sulphamic acid (7 parts), stirring at 0–5° C. After stirring for a further 2 hours, the product was isolated by filtration, washed with cold water and dried at 50° C. Yield 39 parts.

Example 2

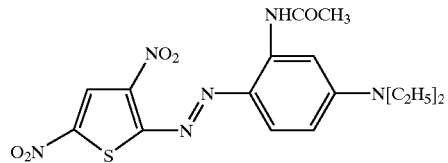

2-Amino-3,5-dinitrothiophene (19 parts) was stirred at 0–5° C. with a mixture of acetic/propionic acids (100 parts, 86:14). Nitrosyl sulphuric acid (35 part, 40% solution in $H_2SO_4$) was added gradually at 0–5° C. and the mixture was stirred at that temperature for 30 mins. The diazo solution was added to a coupling mixture of N,N-diethyl-m-aminoacetanilide (21.6 parts), water (100 parts), conc. sulphuric acid (20 parts) and sulphamic acid (7 parts), stirring at 0–5° C. After stirring for a further hour, the product was isolated by filtration, washed with cold water and dried at 50° C. Yield 30 parts.

EXAMPLES 3–4

Preparation of Mixtures

Example 3

A mixture of 33.5 parts of dye (1) and 3.2 parts of dye (2) was prepared by mixing the two dyes together and milling them as a 40% aqueous slurry with 20 parts of a high temperature stable dispersing agent until the dye particle size (mean diameter) was in the range 0.1–5 microns.

This dispersion was "standardised" (ie adjusted to the desired shade and strength) to provide a liquid composition containing 18.35% of the mixture, by the addition of 6.5 parts of a humectant and water (to 100 parts).

The same dispersion was standardised to provide a solid composition containing 36.7% of the mixture and 63.3% dispersing agent, by the addition of 43.3 parts of a temperature stable dispersing agent and drying to either a grain or powder form in a spray dye.

Example 4

Example 3 was repeated, using exactly the same proportions and procedure but replacing dye (1) by dye (3).

The liquid compositions of Examples 3 and 4 are especially suitable for use in the direct printing and continuous dyeing of polyester and polyester/cellulose blends and can also be used for exhaust dyeing.

The solid composition of Examples 3 and 4 are especially suitable for the exhaust dyeing of polyester, polyester/cellulose and polyester/wool blends and can also be used for continuous dyeing and direct printing.

Example 5

A dyebath for the exhaust dyeing of polyester in piece form was prepared by adding 3 mls of an aqueous dispersion of the solid composition of Example 3 (1 g dye in 100 ml water at 40–50° C.) to 55.8 ml of de-ionised water and 1.2 ml of buffer solution. To this dyebath was added a 5 g piece of polyester and the whole was held for 45 minutes at 130°

C. in a Werner Mathis Labomat high temperature dyeing machine. After rinsing with water and a reduction clearing treatment, the material was dyed a bright reddish blue shade which appeared almost identical when viewed under both normal daylight and tungsten light sources.

What is claimed is:

1. A dye mixture comprising
(A) at least one dye of the formula (I)

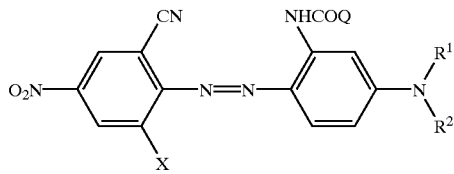

wherein
X is Cl, Br or I;
Q is $C_{1-4}$alkyl; and
each of $R^1$ and $R^2$, independently, is $C_{1-4}$alkyl; and
(B) at least one dye of the formula (II)

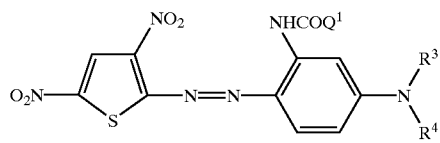

wherein
$Q^1$ is $C_{1-4}$alkyl; and
each of $R^3$ and $R^4$, independently, is $C_{1-4}$alkyl.

2. A dye mixture according to claim 1, wherein the ratio, by weight, of dye (I):dye (II) is from 98:2 to 50:50.

3. A dye mixture according to claim 2, wherein said ratio is from 95:5 to 70:30.

4. A dye mixture according to claim 3, wherein said ratio is from 93:7 to 85:15.

5. A dye mixture according to claim 1, further comprising at least one additional dye.

6. A dye mixture according to claim 1, which comprises, as component (A), a dye (1) of the formula (I), wherein X is Br, Q is methyl and each of $R^1$ and $R^2$ is ethyl and, as component (B), a dye (2) of the formula (II), wherein $Q^1$ is methyl and each of $R^3$ and $R^4$ is ethyl.

7. A dye mixture according to claim 6, wherein the ratio by weight of dye (1):dye (2) is 91.5:8.5.

8. A dye mixture according to claim 1, which comprises, as component (A), a dye (3) of the formula (I), where X is Br, Q is ethyl and each of $R^1$ and $R^2$ is ethyl and, as component (B), a dye (2) of the formula (II), wherein $Q^1$ is methyl and each of $R^3$ and $R^4$ is ethyl.

9. A composition comprising a dye mixture according to claim 1 and at least one dispersing agent, surfactant or wetting agent.

10. A process for colouring a synthetic textile material or fibre blend thereof, which comprises applying thereto a dye mixture according to claim 1.

11. A process for colouring a synthetic textile material or fibre blend thereof, which comprises applying thereto a composition according to claim 9, dispersed in an aqueous medium.

12. A process according to claim 10, wherein the synthetic textile material or fibre blend thereof is a polyester or a polyester-cellulose or polyester-wool blend respectively.

* * * * *